United States Patent
Yoshida (10) Patent No.: US 11,966,643 B2
(45) Date of Patent: Apr. 23, 2024

(54) DEVICE AND STORAGE MEDIUM STORING COMPUTER PROGRAM

(71) Applicant: BROTHER KOGYO KABUSHIKI KAISHA, Nagoya (JP)

(72) Inventor: Seiya Yoshida, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/190,202

(22) Filed: Mar. 27, 2023

(65) Prior Publication Data
US 2023/0325132 A1 Oct. 12, 2023

(30) Foreign Application Priority Data

Apr. 8, 2022 (JP) .................................. 2022-064702

(51) Int. Cl.
*G06F 3/12* (2006.01)

(52) U.S. Cl.
CPC .......... *G06F 3/1236* (2013.01); *G06F 3/1203* (2013.01); *G06F 3/121* (2013.01); *G06F 3/1229* (2013.01); *G06F 3/1288* (2013.01); *G06F 3/1204* (2013.01)

(58) Field of Classification Search
None
See application file for complete search history.

(56) References Cited

U.S. PATENT DOCUMENTS

| | | | |
|---|---|---|---|
| 10,904,012 B1* | 1/2021 | Duncan | H04L 9/3247 |
| 2016/0350040 A1* | 12/2016 | Matsui | H04L 41/12 |
| 2021/0072931 A1 | 3/2021 | Matsushima et al. | |
| 2022/0179665 A1* | 6/2022 | Rathod | G06F 9/451 |

FOREIGN PATENT DOCUMENTS

WO 2017/150472 A1 9/2017

* cited by examiner

*Primary Examiner* — Darryl V Dottin
(74) *Attorney, Agent, or Firm* — Merchant & Gould P.C.

(57) ABSTRACT

A controller is configured to: perform a registration process for again storing connection information in an intermediary server; after the registration process, perform a transition process of changing a state of a device from a first state to a second state, the first state being a state where setting information is stored in a memory and a service is usable by the device, the second state being a state where intermediary server information is stored in the memory and the connection information and the setting information are not stored in the memory; after the transition process, receive, from the intermediary server, the connection information that is stored again; connect to a target server by using the received connection information and again receive the setting information from the target server; and store, in the memory, the setting information that is received again.

14 Claims, 8 Drawing Sheets

| GUID | CONNECTION DESTINATION INFORMATION |
|---|---|
| ID1 | CI1 |
| ID2 | CI2 |
| ⋮ | ⋮ |

CONNECTION INFORMATION DATABASE CDB

DEVICE AND STORAGE MEDIUM STORING COMPUTER PROGRAM

REFERENCE TO RELATED APPLICATIONS

This application claims priority from Japanese Patent Application No. 2022-064702 filed on Apr. 8, 2022. The entire content of the priority application is incorporated herein by reference.

BACKGROUND ART

A system including a multifunction peripheral (MFP) connected to a server is known.

DESCRIPTION

In a system, a multifunction peripheral (MFP) accesses a connection-destination providing server and receives a URL of a server that stores an application. The MFP accesses the server using the received URL and downloads the application.

However, when transitioning the state of the MFP, for example, when transitioning from a state of accessible to the server to a state at the time of shipment from the factory, there is a possibility that the MFP may not be able to access the server and use the service provided by the server.

In view of the foregoing, an example of an object of this specification is to provide a technique that, when transitioning the state of a device connected to a server, suppresses a situation that the device after the transition is unable to use a service provided by the server.

According to one aspect, this specification discloses a device. The device includes a communication interface, a memory, and a controller. The memory stores intermediary server information for connecting to an intermediary server. The intermediary server is configured to store device identification information and connection information in association with each other. The device identification information indicates the device. The connection information is information indicating a location of a target server to be connected. The controller is configured to connect, via the communication interface, to the intermediary server by using the intermediary server information, and receive the connection information from the intermediary server in a case where the connection information is stored in the intermediary server. Thus, the device connects to the intermediary server by using the intermediary server information and receives the connection information from the intermediary server. The controller is configured to connect, via the communication interface, to the target server by using the connection information, and receive setting information from the target server, the setting information being information for the device to use a service provided by the target server. Thus, the device connects to the target server by using the connection information, and receives the setting information from the target server. The controller is configured to store the received setting information in the memory. The controller is configured to perform a registration process for again storing the connection information in the intermediary server. Thus, the connection information is stored in the intermediary server again. The controller is configured to, after the registration process, perform a transition process of changing a state of the device from a first state to a second state. The first state is a state where the setting information is stored in the memory and the service is usable by the device. The second state is a state where the intermediary server information is stored in the memory and the connection information is not stored in the memory and the setting information is not stored in the memory. Thus, the state of the device is changed from the first state to the second state. The controller is configured to, after the transition process, receive, from the intermediary server, the connection information that is stored again. Thus, the device receives the connection information again. The controller is configured to connect, via the communication interface, to the target server by using the received connection information and again receive the setting information from the target server, and store, in the memory, the setting information that is received again. Thus, the device receives and stores the setting information again. This suppresses a situation that the device after the transition is unable to use the service provided by the target server.

The technology disclosed herein may be implemented in various forms, for example, a system including a target server and a device, a method in a device or a system, a computer program for realizing functions of these devices and method, a storage medium storing the computer program, and so on.

A. FIRST EMBODIMENT

A-1. Configuration of System 1000

Figure 1:
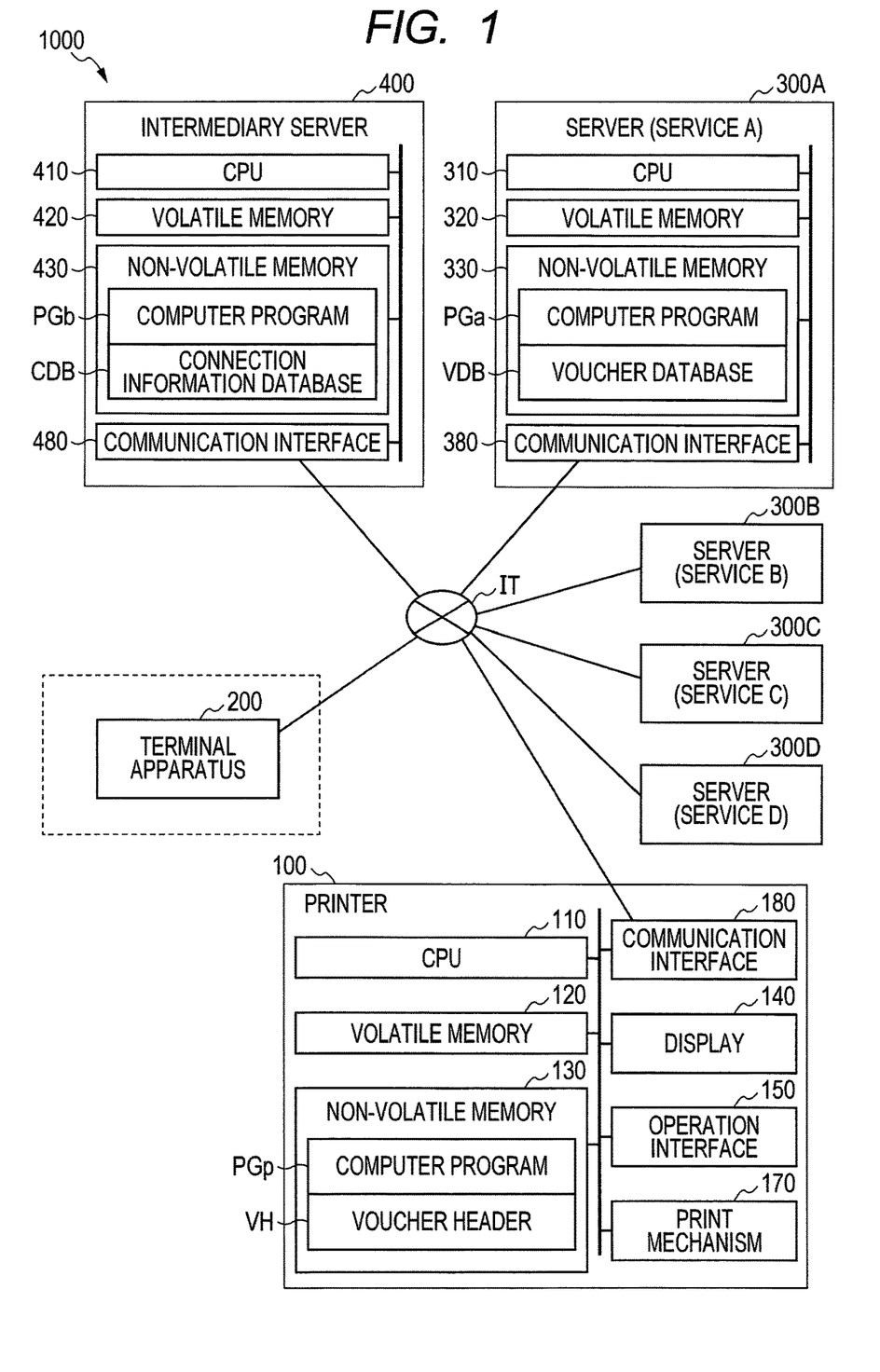
FIG. 1 is a block diagram showing a configuration of a system 1000.

As shown in FIG. 1, the system 1000 includes a printer 100, servers 300A to 300D that provide services using printers, and an intermediary server 400. A terminal apparatus 200 may not be provided in the first embodiment, but is provided in a second embodiment. For this reason, the terminal apparatus 200 will be described in the second embodiment.

The printer 100 includes, as a controller of the printer 100, a CPU 110, a volatile memory 120 such as a DRAM, and a non-volatile memory 130 such as a hard disk or flash memory. The printer 100 also includes a display 140 such as a liquid crystal display for displaying images, an operation interface 150 such as buttons and a touch panel for acquiring user operations, a print mechanism 170 (print engine), and a communication interface (IF) 180.

The communication interface 180 is an interface for connecting to the Internet IT, such as a wired interface conforming to Ethernet or a wireless interface conforming to the Wi-Fi standard. "Ethernet" is a registered trademark of Ethernet, LLC.

The CPU 110 is an arithmetic device (processor) that performs data processing. The volatile memory 120 provides a buffer area for temporarily storing various intermediate data generated when CPU 110 performs processing.

The non-volatile memory 130 stores a computer program PGp for controlling the printer 100 and a voucher header VH described later.

In this embodiment, the computer program PGp is preliminarily stored in the non-volatile memory 130 when the printer 100 is manufactured. Alternatively, the computer program PGp may be provided, for example, in a form downloaded from a server connected via the Internet IT, or in a form recorded on a CD-ROM and so on.

The CPU 110 controls the printer 100 by executing the computer program PGp. For example, as will be described later, the CPU 110 cooperates with any one of the servers 300A to 300D to execute a process (hereinafter also referred to as a service process) of providing the user with a particular service (for example, a setup service, a consumable management service, and a print service described later). In addition, as will be described later, prior to the service process, the CPU 110 cooperates with the target server and the intermediary server 400 to perform advance preparation described later.

The print mechanism 170 executes printing under the control of the CPU 110. The print mechanism 170 of this embodiment is an inkjet print mechanism that prints an image on a recording medium using ink of a plurality of types (for example, ink of four types of cyan, magenta, yellow, and black) as colorant. Alternatively, the print mechanism 170 may be an electrophotographic print mechanism that prints an image on a recording medium using toner as colorant.

The servers 300A to 300D are, for example, computers operated by service providers, such as cloud servers. For example, the companies that operate the servers 300A to 300D are the company that manufactures the printer 100 or a third party that is different from the company. Each of the servers 300A to 300D may include two or more servers operated by two or more different operators. Services provided by the servers 300A to 300D are referred to as services A to D, respectively. The services A to D include, for example, a setup service, a consumable management service, and a print service. The setup service is, for example, a service for installing programs such as drivers and applications in the printer 100 and performing particular settings. The consumable management service is, for example, a service that manages the remaining amount of consumables such as ink in the printer 100 and delivers the consumables to the user according to the consumption of the consumables. The print service is, for example, a service that causes the printer 100 to perform printing by generating a print job using an image file transmitted from the user's terminal and transmitting the generated print job to the printer 100.

The server 300A includes a CPU 310 as a controller, a volatile memory 320 such as a DRAM, a non-volatile memory 330 such as a hard disk or flash memory, and a communication interface (IF) 380. The communication IF 380 is, for example, a wired interface conforming to Ethernet.

The CPU 310 is an arithmetic device (processor) that performs data processing. The volatile memory 320 provides a buffer area for temporarily storing various intermediate data generated when the CPU 310 performs processing. The non-volatile memory 330 stores a computer program PGa and a voucher database VDB described later.

The computer program PGa is provided, for example, in a form of being uploaded by an operator who operates the server 300A. The CPU 310 of the server 300A cooperates with the printer 100 by executing the computer program PGa to execute a service process for realizing the service to be provided. In addition, prior to the service process, the CPU 310 cooperates with the server 300A and the intermediary server 400 to execute advance preparation described later.

The servers 300B to 300D have configurations 310 to 380 (not shown) similar to those of the server 300A described above. A description of the configuration of the servers 300B to 300D is omitted.

The intermediary server 400 is a computer, for example, a cloud server, operated by a particular business operator (for example, a company that provides a service or a company that manufactures the printer 100). Like the server 300A, the intermediary server 400 includes a CPU 410 as a controller, a volatile memory 420, a non-volatile memory, and a communication interface 480. The volatile memory 420 provides a buffer area for temporarily storing various intermediate data generated when the CPU 410 performs processing. The non-volatile memory 430 stores a computer program PGb and a connection information database CDB described later.

The computer program PGb is provided, for example, in a form of being uploaded by a company who operates the intermediary server 400. The CPU 410 of the intermediary server 400 cooperates with the printer 100, and the servers 300A to 300D by executing the computer program PGb to execute advance preparations described later.

Each of the printer 100, the terminal apparatus 200, the servers 300A to 300D, and the intermediary server 400 is connected to the Internet IT. Thus, these devices 100-400 communicate with each other via the Internet IT.

Figure 2A:
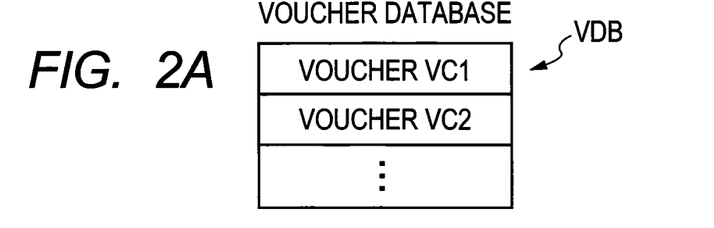
FIGS. 2A, 2B, 2C and 2D are explanatory diagrams of databases and information stored in the databases.

FIG. 2A illustrates an example of a voucher database VDB stored in the non-volatile memory 330 of the servers 300A to 300D. The voucher database VDB stores one or more vouchers VC (VC1, VC2 in FIG. 2A, for example).

Figure 2B:
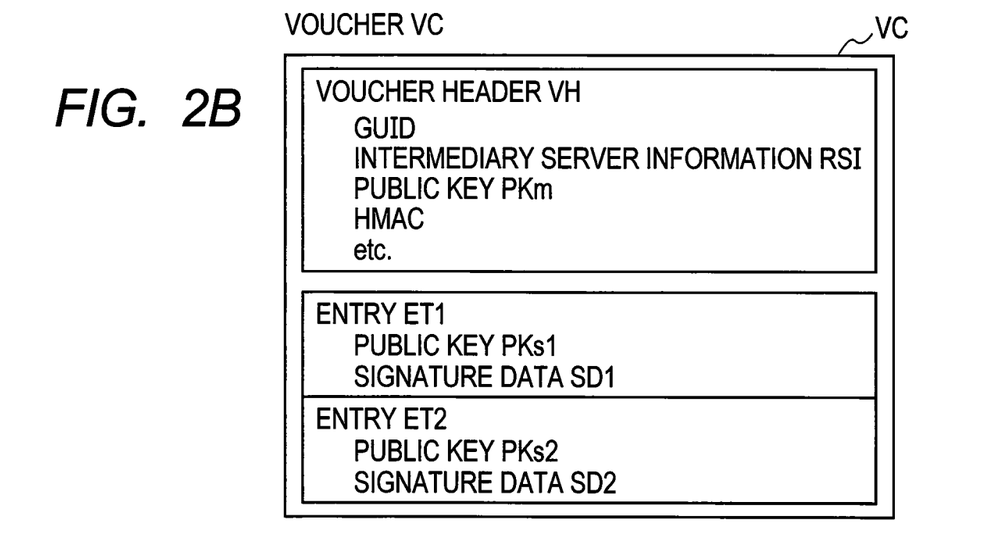

FIG. 2B illustrates an example of the voucher VC. The voucher VC is data which certifies ownership of a device (in this embodiment, the printer 100). The voucher VC includes a voucher header VH and one or more entries ET (ET1, ET2 in FIG. 2B, for example).

The voucher header VH includes a GUID, intermediary server information RSI, a public key PKm, and HMAC. The GUID is an identifier which identifies the printer 100. The intermediary server information RSI is information for connecting communication with the intermediary server 400. The intermediary server information RSI includes information indicating the location of the intermediary server 400 (IP address or URL (Uniform Resource Locator), for example), a port number, and information on a protocol to be used for connection. The public key PKm is a public key corresponding to a private key owned by a manufacturer of the printer 100. The HMAC (hash message authentication code) is a message authentication code, and is calculated by using a private key (not shown) owned by the printer 100, a hash function, and data (the voucher header VH and a secret owned by the printer 100, for example), for example.

As shown in FIG. 1, the voucher header VH is also stored in the non-volatile memory 130 of the printer 100.

The entry ET includes a public key PKs and signature data SD. The entry ET is information that is added each time the delivery of voucher VC is performed, that is, each time the owner of the voucher VC is changed. The public key PKs is a public key corresponding to a private key owned by a delivery destination, while the signature data SD is data obtained by encrypting the public key PKs by using the private key owned by the delivery source. The voucher VC in FIG. 2B includes two entries ET1, ET2. Thus, it is known that the delivery of the voucher VC in FIG. 2B has been performed twice. The entry ET and the HMAC included in the voucher VC are used for an authentication process in an onboarding process described later.

Figure 2C:
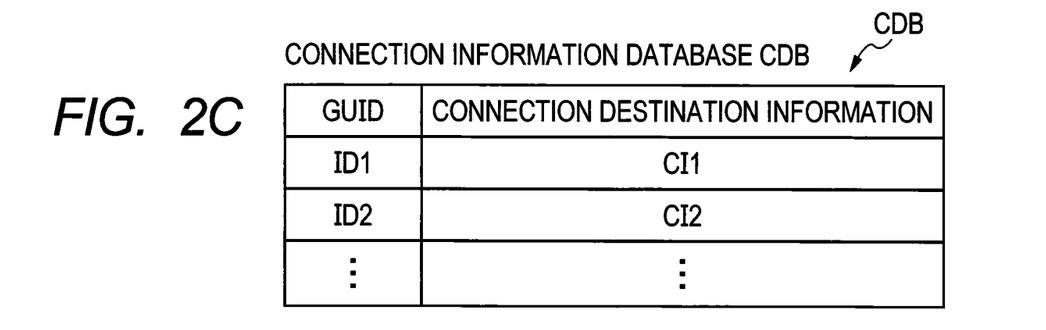

FIG. 2C illustrates an example of a connection information database CDB. The connection information database CDB stores one or more pieces of connection information (connection destination information) CI in association with the GUID. In the example in FIG. 2C, connection information CI1 is stored in association with the GUID "ID1", and connection information CI2 is stored in association with the GUID "ID2". Each of the connection information CI is information which should be transmitted to the device (the printer 100, for example) identified by the associated GUID.

Figure 2D:
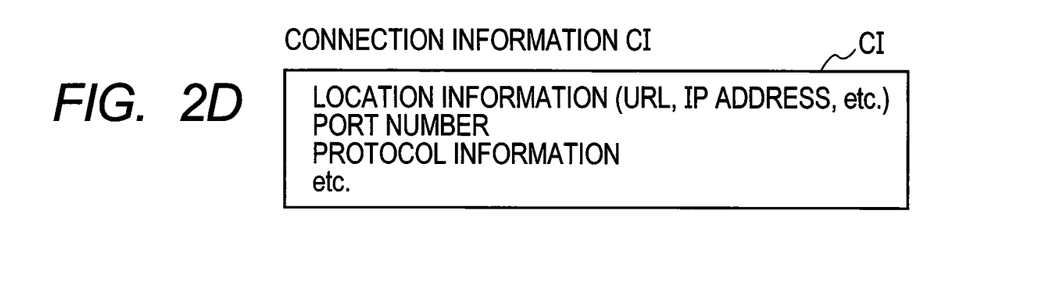

FIG. 2D illustrates an example of connection information CI. The connection information CI is information for connecting communication with a server (the server 300A, for example) to execute a service process in cooperation with the device (the printer 100, for example). The connection information CI includes information indicating the location (IP address, URL (Uniform Resource Locator), for example) of the server (the server 300A, for example) to execute the service process, a port number, and information on a protocol to be used for connection, for example.

A-2. Process from Manufacture of Printer 100 to Preparations for Service

Hereinafter, processes from the manufacture of the printer 100 to preparations for service will be explained. In this embodiment, the printer 100 is manufactured by a manufacturer and delivered to a sales company. After that, the printer 100 is delivered from the sales company to a user and set such that a service process is executed with a target server (the server 300A, for example) which provides a service that the user desires to use.

In the manufacture process of the printer 100, the voucher header VH is stored in the printer 100. The storage of the voucher header VH is performed in compliance with DI (Device Initialize Protocol) specified in the "FIDO Device Onboarding (FDO) Specification" (hereinafter, also referred to as the FDO specification), which is a standard specification open to the public by the FIDO Alliance, for example. Accordingly, the voucher header VH in the voucher VC in FIG. 2B is generated and stored in the non-volatile memory 130 of the printer 100.

In response to an order from the sales company, the voucher VC and the printer 100 are delivered from the manufacturer to the sales company, for example. For example, the manufacturer receives a public key PKs1 from the sales company. The sales company prepares a key pair of the private key and the public key PKs1, and when ordering the printer 100, transmits the public key PKs1 from a computer (not shown) of the sales company to a computer (not shown) of the manufacturer. The manufacturer executes a voucher extension process by using the computer. For example, the computer of the manufacturer generates the entry ET1 (FIG. 2B) including the public key PKs1 received from the sales company, and signature data SD1 acquired by encrypting the public key PKs1 by using the private key of the manufacturer. The private key of the manufacturer is a private key corresponding to the public key PKm included in the voucher header VH (FIG. 2B). The computer of the manufacturer transmits the voucher VC including the voucher header VH and one entry ET1 to the computer of the sales company. The printer 100 is delivered from the manufacturer to the sales company.

Figure 3:
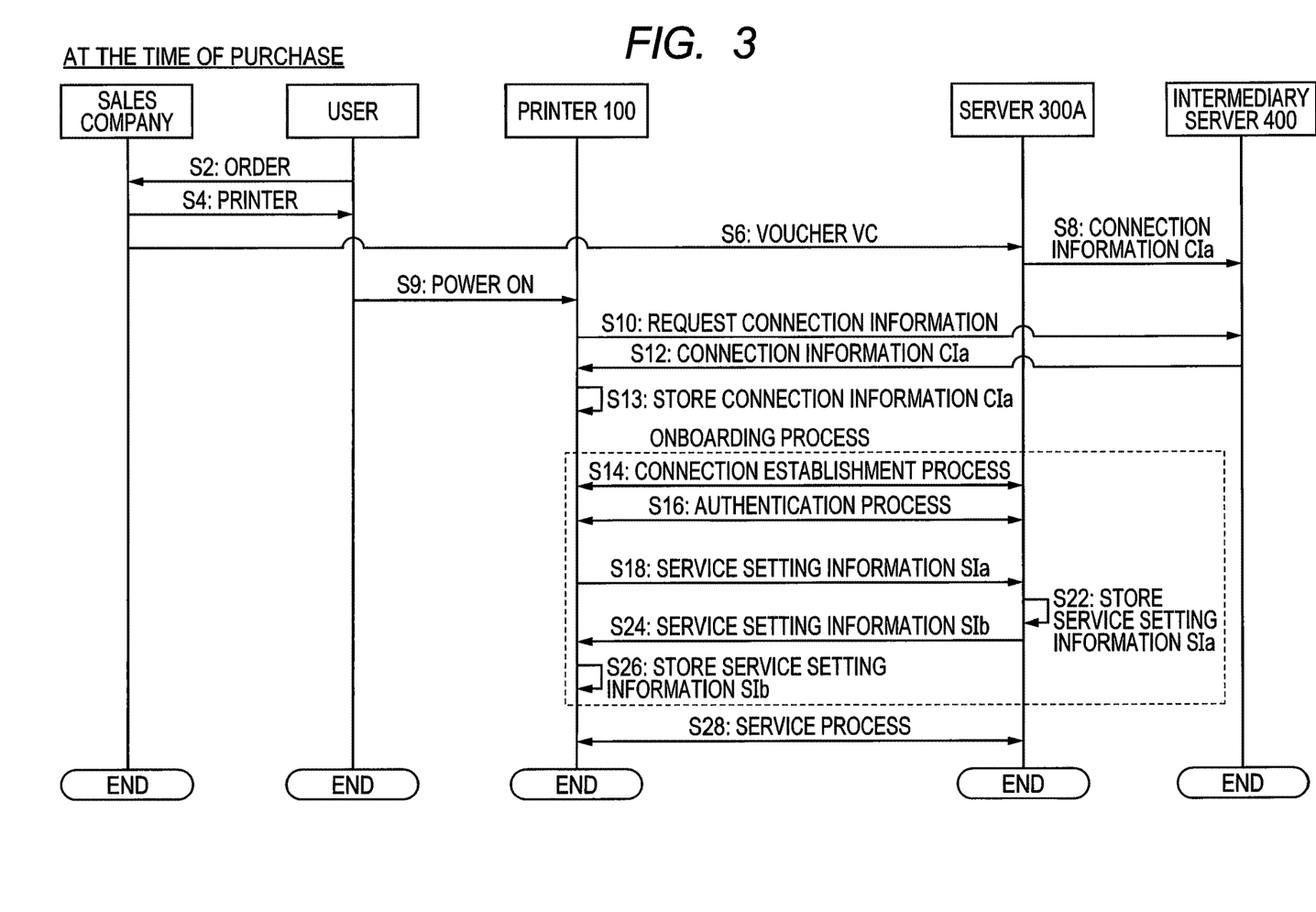
FIG. 3 is a sequence diagram of processing executed when a user purchases a printer 100.

FIG. 3 is a sequence diagram of processes executed when the user purchases the printer 100. The user orders the printer 100 in S2, and the sales company sends the ordered printer 100 in S4. At the order of the printer 100, the user makes a use contract for a desired service, from available services A to D. Hereinafter, it is assumed that the use contract for the service A has been made between the sales company and the user.

When the sales company sends the printer 100, the sales company executes process in S6 before the printer 100 arrives to the user. In S6, the sales company registers the voucher VC to the server 300A which provides the service A to be used by the user. Here, the server which provides the service to be used is also called a target server. In the example in FIG. 3, the server 300A (FIG. 1) which provides the service A is the target server. For example, a person at the sales company operates the computer of the sales company so as to access a WEB page provided by the server 300A and to perform particular operations. As a result, a process of registering the voucher VC in the server 300A is executed between the computer of the sales company and the server 300A.

Specifically, the server 300A owns the key pair of the private key and a public key PKs2 and transmits the public key PKs2 to the computer of the sales company. The computer of the sales company generates the entry ET2 (FIG. 2B) including the public key PKs2 and signature data SD2 acquired by encrypting the public key PKs2 by using the private key of the sales company (the private key corresponding to the public key PKs1). The computer of the sales company transmits, to the server 300A, the voucher VC (FIG. 2B) in which the entry ET2 has been added to the voucher VC received from the manufacturer. The server 300A stores the received voucher VC in the voucher database VDB (FIG. 2A). In this way, the voucher VC is registered in the server 300A.

In a modification, the voucher VC may be delivered from the sales company to the user, and the user may register the voucher VC in the target server (the server 300A, for example) from his/her own terminal apparatus 200.

In response to receiving the voucher VC, in S8 the server 300A registers connection information CIa in the intermediary server 400. The connection information CIa is the connection information CI (FIG. 2D) for connection to the server 300A. The registration of the connection information CIa is executed in compliance with TO0 (Transfer Ownership Protocol 0) specified in the FOD specification. For example, the connection information CIa and the GUID of the printer 100 included in the received voucher VC are transmitted from the server 300A to the intermediary server 400. The intermediary server 400 stores the received connection information CIa and the GUID of the printer 100 in association with each other in the connection information database CDB (FIG. 1, FIG. 2C). As a result, the connection information CIa associated with the GUID of the printer 100 is registered (stored) in the intermediary server 400. After a particular period (one week, for example) has elapsed since the registration of the connection information CIa, the intermediary server 400 deletes the connection information CIa. Thus, processes in S10 and S12 described later are assumed to be executed within the particular period from the registration of the connection information CIa.

When the printer 100 is delivered to the user, the user A installs the printer 100 so as to be connectable with the Internet IT and powers on the printer 100 in S9.

When the printer 100 is powered on, in S10 and S12, a connection information acquisition process is executed between the printer 100 and the intermediary server 400. The connection information acquisition process is executed in compliance with TO1 (Transfer Ownership Protocol 1) specified in the FDO specification.

In S10, the printer 100 establishes connection of communication with the intermediary server 400 by using the intermediary server information RSI included in the voucher header VH (FIG. 1) stored in the non-volatile memory 130 and transmits a request for the connection information to the intermediary server 400. In the request for connection information, the GUID in the voucher header VH, that is, the GUID for identifying the printer 100 itself is included.

In S12, the intermediary server 400 transmits, to the printer 100, the connection information CIa associated with the received GUID in the connection information database CDB. As a result, the printer 100 receives the connection information CIa from the intermediary server 400.

In S13, the printer 100 stores the received connection information CIa in the non-volatile memory 130.

When the printer 100 receives the connection information CIa, in S14 to S26, the onboarding process is executed between the printer 100 and the server 300A which is the target server. The onboarding process is executed in compliance with TO2 (Transfer Ownership Protocol 2) specified in the FDO specification.

The onboarding process includes a connection establishment process (S14), an authentication process (S16), and a service preparation process (S18 to S26).

In S14, the printer 100 and the server 300A execute the connection establishment process for establishing the connection between an application operating on the printer 100 and an application operating on the server 300A in compliance with the TCP (Transmission Control Protocol) and the IP (Internet Protocol), for example. These applications execute the authentication process and the service preparation process after the connection establishment process.

In S16, the printer 100 and the server 300A execute an authentication process for confirming each other's authenticity, between the printer 100 and the server 300A. For example, the printer 100 transmits a token in compliance with a particular format (EAT (Entity Attestation Token) format, for example) to the server 300A, and the server 300A verifies the authenticity of the token by using the designated public key so that the authenticity of the printer 100 is confirmed.

The server 300A further transmits, to the printer 100, a particular message and the signature data acquired by encrypting the message by using the private key. The server 300A identifies the voucher VC associated with the GUID transmitted from the printer 100 from the voucher database VDB and transmits the same to the printer 100. The printer 100 sequentially verifies the entries ET1, ET2 included in the voucher VC. For example, the printer 100 verifies the entry ET1 by using the public key PKm included in the voucher header VH. The printer 100 then verifies the entry ET2 by using the public key PKs1 included in the verified entry ET1. Lastly, the printer 100 verifies the signature data transmitted from the server 300A by using the public key PKs2 included in the verified entry ET2 so as to confirm the authenticity of the server 300A.

If the server 300A fails to confirm the authenticity of the printer 100, the server 300A rejects to proceed to the service preparation process (not shown). Similarly, if the printer 100 fails to confirm the authenticity of the server 300A (authenticity of the voucher VC), the printer 100 rejects to proceed to the service preparation process (not shown).

In S18 to S26, the printer 100 and the server 300A executes the service preparation process which exchanges service setting information, required for execution of the service process between the printer 100 and the server 300A, after the authenticity of each other is confirmed by the authentication process.

In S18, the printer 100 transmits, to the server 300A, service setting information SIa required for the server 300A to execute the service process. As a result, the server 300A receives the service setting information SIa. The service setting information SIa includes information indicating the format of information to be transmitted by the printer 100 to the server 300A in the service process, for example. In response to receiving the service setting information SIa, in S22 the server 300A stores the service setting information SIa in the non-volatile memory 330.

In S24, the server 300A transmits, to the printer 100, service setting information SIb required for the printer 100 to execute the service process. As a result, the printer 100 receives the service setting information SIb. The service setting information SIb includes a token, format information, and protocol information that are used when communication for the service process is performed between the printer 100 and the server 300A, for example. In response to receiving the service setting information SIb from the server 300A, in S26 the printer 100 stores the service setting information SIb in the non-volatile memory 130.

When the service preparation process is executed and the service setting information SIb is stored in the non-volatile memory 130, the printer 100 and the server 300A change to a state where the service process is executable, that is, the state of the printer 100 changes to a state where the service A provided by the server 300A is usable by the printer 100 (hereinafter, also referred to as an onboard state). In the onboard state, the connection information CIa received from the intermediary server 400 (S12) and the service setting information SIb received from the server 300A (S24) are stored in the non-volatile memory 130 (S13, S26). If the service setting information SIb includes information for connecting to the server 300A during the service process (URL or a port number for the service process), the connection information CIa is not required for the service process and may be deleted from the non-volatile memory 130 after the onboarding process. The onboard state may be a state where at least the service setting information SIb is stored in the non-volatile memory 130 and thus the service A is usable by the printer 100.

When the state of the printer 100 changes to the onboard state, the printer 100 and the server 300A execute the service process in cooperation in S28. If the service A provided by the server 300A is a consumable management service, for example, the service process includes a process in which the printer 100 regularly transmits information on the remaining amount of consumable such as ink to the server 300A.

By using the method explained above, there are the following merits, for example. By the above method, the user and the sales company receive provision of a service desired by the user, by registering the voucher VC in the target server (S6 in FIG. 3). Thus, the user and the sales company easily select a service the user should receive.

The printer 100 acquires the connection information CI of the target server from the intermediary server 400 (S12 in FIG. 3). Thus, at a stage of the manufacture process of the printer 100, since the intermediary server information RSI used for connection to the intermediary server 400 is stored in the printer 100 (non-volatile memory 130), the connection information CI of the target server need not be stored in the printer 100. The printer 100 acquires, from the target server, the service setting information SIb, required for executing the service process, in cooperation with the target server (S24 in FIG. 3). Thus, at the stage of the manufacture process of the printer 100, the service setting information SIb need not be stored in the printer 100. Thus, at the stage of the manufacture process of the printer 100, it is unnecessary to assume a service to use, and even for a service that is started after the manufacture of the printer 100, or a service provided by a third party not recognized by the manufacturer at the time point of manufacture of the printer 100, the user is able to use such services with the printer 100. As a result, the services are flexibly provided and used. For example, a provider of a service may add a new service afterwards without remodeling and so on of the printer 100. For example, the user and the sales company easily select or change a service to use. Since none of the manufacturer, the sales company, or the user of the printer 100 needs to customize the printer 100 for connection to the service desired by a user at the point of shipment or use, burdens on the manufacturer, the sales company, and the user of the printer 100 are reduced.

In the above method, the printer 100 and the target server confirm the authenticity of each other by verification of the voucher VC and the verification of the token. If the printer 100 or the target server does not confirm the authenticity of the other party, they reject execution of the onboarding process. This suppresses an occurrence of such security problems as connection of the printer 100 to an unintended server, connection of an illegal device different from the printer 100 to the target server, and so on.

A-3. Process when Printer 100 is Initialized

The printer 100 of this embodiment executes an initialization process (also called factory reset) that initializes the state of the printer 100 to a state at the time of factory shipment. For example, when an error which is difficult to be solved occurs in the printer 100, or when the printer 100 is transferred to a third party, the user may desire to return the printer 100 to the factory shipment state in some cases. When the initialization process is executed, all the data that has been stored in the memory of the printer 100 (the non-volatile memory 130 and the volatile memory 120) after the printer 100 was delivered to the user are deleted. Even if the initialization process is executed, the data stored in the memory of the printer 100 at the point of factory shipment, such as the voucher header VH (FIG. 1), the computer program PGp (FIG. 1), and default setting information (not shown) are not deleted.

When the printer 100 changes from the onboard state to the factory shipment state by the initialization process, the connection information CIa and the service setting information SIb are deleted from the memory. Thus, after execution of the initialization processing, the printer 100 is unable to execute the service process by connecting to the server 300A. Thus, if the user wants to use the service A by using the printer 100 after the initialization process, the onboarding process described above needs to be executed again. An initialization-related process executed when the printer 100 is initialized will be described below.

Figure 4:
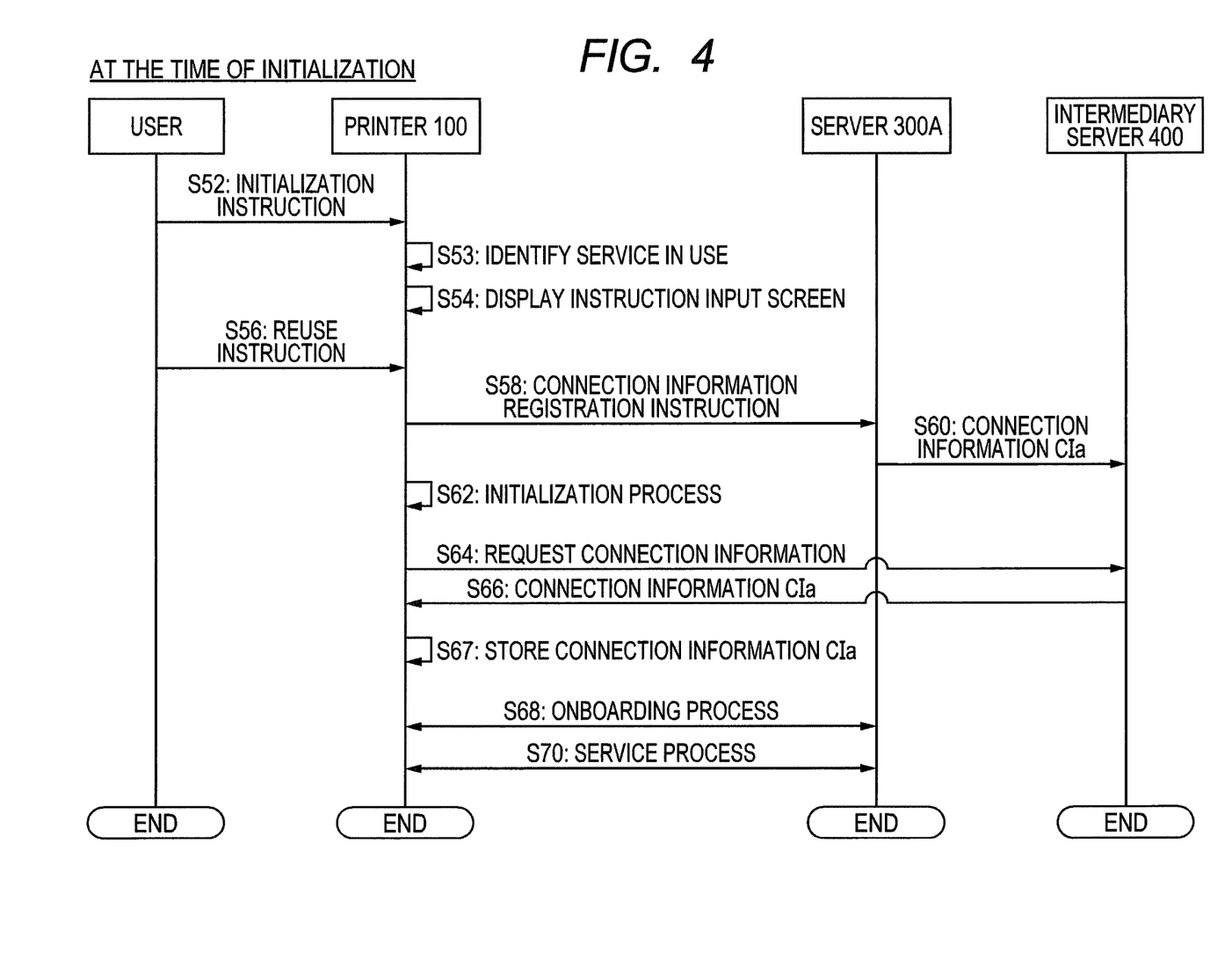
FIG. 4 is a sequence diagram of an initialization related process.

FIG. 4 illustrates the initialization-related process of the first embodiment. When the user operates the operation interface 150 and inputs an initialization instruction to the printer 100 in S52, the initialization-related process is started.

In S53, the printer 100 identifies the service currently in use by using the printer 100. For example, when the service setting information SIb used for the service A is stored in the non-volatile memory 130, the printer 100 identifies the service A as the service in use.

In S54, the printer 100 displays an instruction input screen W1 on the display 140. The instruction input screen W1 shown in FIG. 5A includes a message MS1 for notifying the user of the service in use and inquiring the user whether the user will use the service after the initialization process, and buttons BT1, BT2. The button BT1 is a button for inputting an instruction to use the service currently in use also after the initialization (reuse instruction). The button BT2 is a button for inputting an instruction not to use the service in use after the initialization.

Figure 5A:
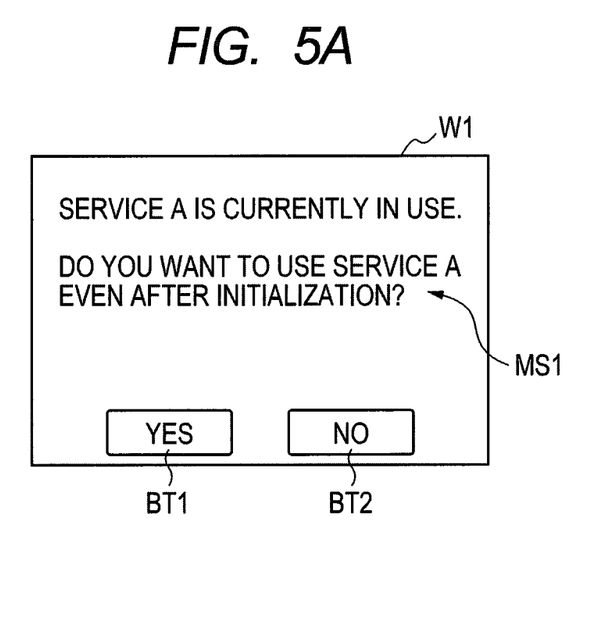
FIGS. 5A and 5B are diagrams showing an example of a screen displayed on a display 140.

When the button BT2 is pressed, the printer 100 executes the initialization process, and changes the state of the printer 100 to the state at the factory shipment, and ends the initialization-related process (not shown).

When the button BT1 is pressed, the printer 100 acquires the reuse instruction in S56. In response to acquiring the reuse instruction, in S58 the printer 100 transmits a connection information registration instruction to the server 300A which provides the service A in use. Since the state of the printer 100 is the onboard state, the printer 100 is communicable with the server 300A and transmits the connection information registration instruction.

In response to receiving the connection information registration instruction, similarly to S8 in FIG. 3, in S60 the server 300A registers, in the intermediary server 400, the connection information CIa for connection to the server 300A. At this point of time, since a particular period (one week, for example) has elapsed since the registration, it is assumed that the connection information CIa registered in the intermediary server 400 in S8 in FIG. 3 has been deleted in the intermediary server 400. In S60, the connection information CIa is registered in the intermediary server 400 again.

After the printer 100 transmits the connection information registration instruction to the server 300A, the printer 100 executes the initialization process in S62 and changes the state of the printer 100 to the state at the factory shipment. As a result, the connection information CIa received in S12 in FIG. 3 and the service setting information SIb received in S24 in FIG. 3 are deleted from the non-volatile memory 130. The voucher header VH is stored in the non-volatile memory 130 even after the initialization process.

In S64 to S68, the same processes as that in S10 to S26 in FIG. 3 is executed. In S64, the printer 100 establishes connection of communication with the intermediary server 400 by using the intermediary server information RSI included in the voucher header VH (FIG. 1) stored in the non-volatile memory 130, and transmits a request for the connection information to the intermediary server 400.

In S66, the intermediary server 400 identifies the connection information CIa associated with the received GUID in the connection information database CDB, and transmits the connection information CIa to the printer 100. As a result, the printer 100 receives the connection information CIa from the intermediary server 400. In S67, the printer 100 stores the received connection information CIa in the non-volatile memory 130.

In S68, the onboarding process (S14 to S26 in FIG. 3) is executed between the printer 100 and the server 300A which is the target server. In the onboarding process, as described above, the connection establishment process (S14 in FIG. 3), the authentication process (S16 in FIG. 3), and the service preparation process (S18 to S26 in FIG. 3) are executed. In the service preparation process, the printer 100 receives the service setting information SIb from the server 300A (S24 in FIG. 3) and stores the service setting information SIb in the non-volatile memory 130 (S26 in FIG. 3).

When the connection information CIa and the service setting information SIb are stored in the non-volatile memory 130, as described above, the state of the printer 100 changes to the onboard state where the service A provided by the server 300A is usable by the printer 100.

When the state of the printer 100 changes to the onboard state, in S70, the printer 100 and the server 300A executes the service process in cooperation with each other.

According to this embodiment described above, the printer 100 includes the non-volatile memory 130 which is a memory for storing the intermediary server information RSI for connection to the intermediary server 400 in which the connection information CI is registered in association with the GUID (FIG. 1). The printer 100 connects to the intermediary server 400 by using the intermediary server information RSI, and in a case where the connection information CIa is registered in the intermediary server 400, the printer 100 receives the connection information CIa from the intermediary server 400 (S12 in FIG. 3). The printer 100 connects to the server 300A by using the connection information CIa and receives the service setting information SIb for the printer 100 to use the service A (S24 in FIG. 3). The printer 100 stores the received service setting information SIb in the non-volatile memory 130 (S26 in FIG. 3). As a result, the printer 100 is brought into the onboard state where the service A is usable. The printer 100 executes the initialization process to change the state of the printer 100 from the onboard state to the state at the factory shipment (S62 in FIG. 4). The state at the factory shipment is a state where the intermediary server information RSI is stored in the non-volatile memory 130, while the connection information CIa and the service setting information SIb are not stored in the non-volatile memory 130. When the initialization process should be executed, the printer 100 executes the registration process for registering the connection information CIa in the intermediary server 400 again (S58 in FIG. 4). The printer 100 executes the initialization process after the registration process (S62 in FIG. 4). After the initialization process, the printer 100 receives, from the intermediary server 400, the connection information CIa that is registered again (S66 in FIG. 4). The printer 100 connects to the server 300A by using the received connection information CIa, receives the service setting information SIb again, and stores the service setting information SIb in the non-volatile memory 130 so as to become the onboard state (S68 in FIG. 4). This resultantly suppresses a situation that, in a case where the state of the printer 100 is initialized, the printer 100 after the initialization is unable to use the service A provided by the server 300A.

In order to change the printer 100 to the onboard state again after the initialization process is executed, the onboarding process needs to be executed again between the printer 100 and the server 300A. In order for the printer 100 to connect to the server 300A and to execute the onboarding process, the connection information CIa is needed, but the connection information CIa is deleted from the non-volatile memory 130 by the initialization process. Thus, the printer 100 needs to acquire the connection information CIa again.

If the connection information CIa has not been registered in the intermediary server 400 at the time when the initialization process is executed, the printer 100 is unable to receive the connection information CIa from the intermediary server 400. In order to register the connection information CIa again in the intermediary server 400 after the initialization process is executed, following methods are considered.

A first method may be that a registration instruction for the connection information CIa is transmitted from the printer 100 to the server 300A. However, after the initialization process is executed, unlike the onboard state, the service setting information SIb is not stored in the non-volatile memory 130. Thus, it is highly likely that the printer 100 is unable to connect to the server 300A or, even if it is connected to the server 300A, the printer 100 is not authenticated by the server 300A. Thus, it is difficult to transmit the registration instruction from the printer 100 to the server 300A after the initialization process is executed.

A second method may be that the manufacturer, the sales company, or the user, registers the voucher VC in the server 300A again by using a terminal apparatus. However, once the voucher VC is used in the onboarding process, it is highly likely to be invalidated and thus, an effective voucher VC needs to be acquired again. In this case, since a cumbersome procedure such as re-setting of the voucher header VH for the printer 100 is needed, for example, it is difficult for the user to execute the procedure. Even if the procedure is requested to the manufacturer or the sales company, there is a possibility that required time and burden becomes significant.

In this embodiment, before the initialization process is executed, that is, when the printer 100 is in the onboard state, the registration process for registering the connection information CIa in the intermediary server 400 again is executed (S58 in FIG. 4). As a result, after the initialization process is executed, the connection information CIa is registered (stored) in the intermediary server 400. Thus, the printer 100 receives the connection information CIa from the intermediary server 400 (S66 in FIG. 4) after executing the initialization process, connects to the server 300A by using the connection information CIa, and executes the onboarding process (S68 in FIG. 4). This resultantly suppresses a situation that the printer 100 after the initialization is unable to use the service A provided by the server 300A.

According to this embodiment, the registration process executed by the printer 100 is a process of transmitting, to the server 300A, the registration instruction for causing the server 300A to register the connection information CI in the intermediary server 400 (S58 in FIG. 4). In the onboard state before the initialization process is executed, the printer 100 owns (stores) the service setting information SIb (the token for communicating with the server 300A, for example) received in the onboarding process via the authentication process. Thus, the printer 100 transmits the registration instruction of the connection information CIa to the server 300A. Thus, by transmitting the registration instruction to the server 300A, the connection information CIa is registered again in the intermediary server 400.

According to this embodiment, when the initialization processes should be executed, the user acquires the reuse instruction (S56 in FIG. 4), and the printer 100 executes the registration process (transmission of the registration instruction in S58 in this embodiment) in response to acquisition of the reuse instruction. The reuse instruction is also considered to be an execution instruction of the registration process. In some cases, the user may not have an intention to use the service A again after the initialization process. In this case, the onboarding process need not be executed after the initialization process is executed. According to this embodiment, the registration process and the onboarding process are executed in response to acquisition of the instruction from the user, which suppresses execution of the onboarding process against the user's intension.

According to this embodiment, after the registration process, the printer 100 receives the connection information CIa registered again from the intermediary server 400 (S66 in FIG. 4) without acquiring instructions from the user. The printer 100 executes the onboarding process without acquiring instructions from the user, and receives the service setting information SIb from the server 300A again (S68 in FIG. 4). As a result, after the initialization process, the service setting information SIb is acquired promptly. As a result, after the initialization process, the state promptly changes to the onboard state where the service A is usable.

As is known from the explanation above, the GUID in the above embodiment is an example of device identification information, and the initialization process is an example of a transition process.

B. SECOND EMBODIMENT

A system 1000 in a second embodiment includes a terminal apparatus 200 owned by the user of the printer 100. The terminal apparatus 200 is a computer such as a smartphone, for example. In a modification, the terminal apparatus 200 includes a communication interface (not shown), and is connected to the Internet IT. Thus, the terminal apparatus 200 communicates with the server 300A via the Internet IT.

In the second embodiment, the printer 100 does not include the display 140. Thus, the printer 100 does not display an UI screen such as the instruction input screen W1 in FIG. 5A.

Figure 6:
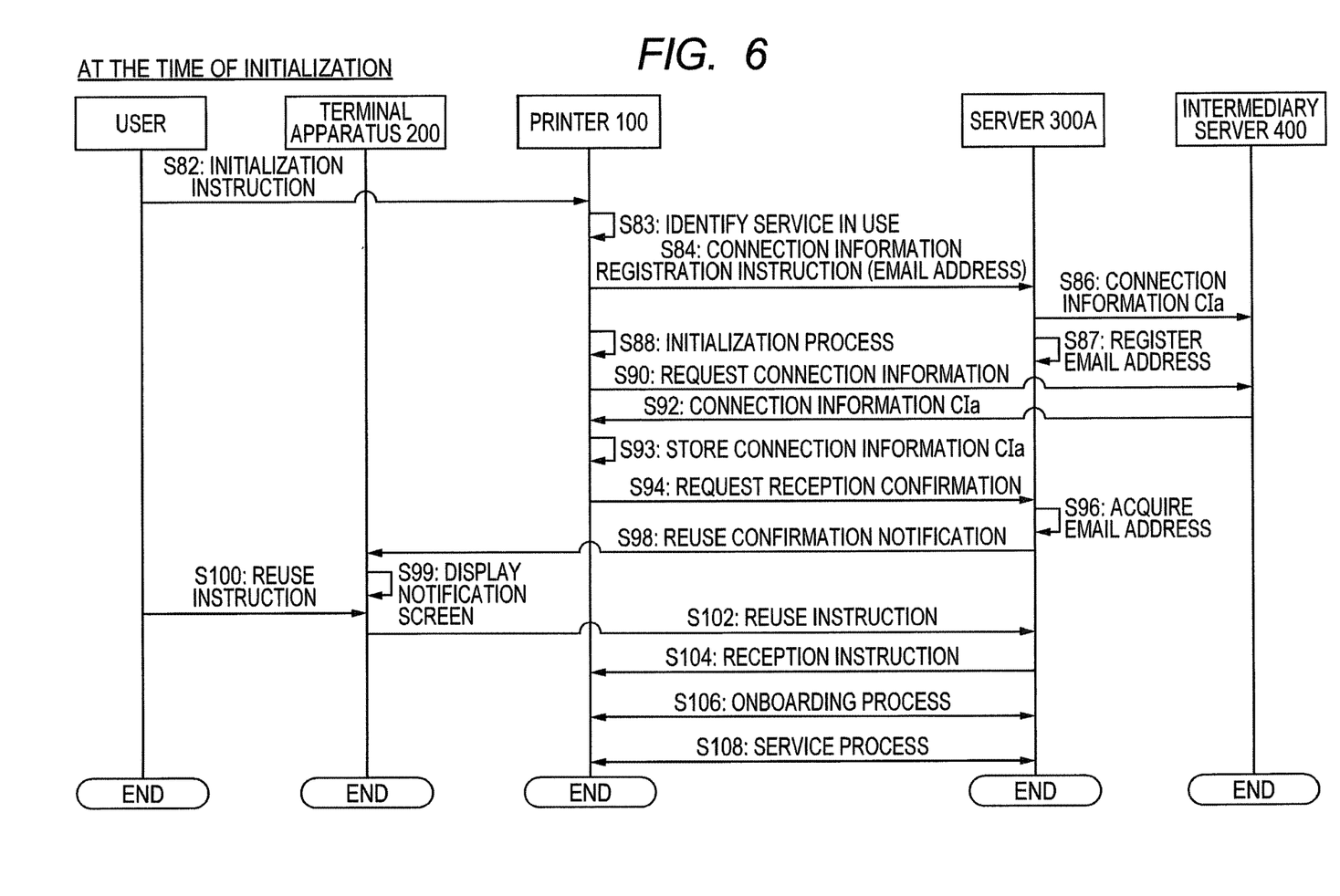
FIG. 6 is a sequence diagram of an initialization related process.

FIG. 6 illustrates an initialization-related process in the second embodiment. In the second embodiment, instead of the initialization related process in FIG. 4 of the first embodiment, the initialization related process in FIG. 6 is executed. When the user operates the operation interface 150 and inputs an initialization instruction to the printer 100 in S82, the initialization related processes is started.

In S83, the printer 100 identifies the service currently in use by using the printer 100. For example, if the service setting information SIb for using the service A is stored in the non-volatile memory 130, the printer 100 identifies the service A as the service in use.

In S84, the printer 100 transmits the connection information registration instruction to the server 300A which provides the service A in use. Here, unlike the connection information registration instruction in the first embodiment (S58 in FIG. 4), the connection information registration instruction in the second embodiment includes an email address of the user in addition to the GUID. The email address of the user is stored in the non-volatile memory 130 based on user's input in advance, for example.

In response to receiving the connection information registration instruction, similarly to S8 in FIGS. 3 and S60 in FIG. 4, in S86 the server 300A registers the connection information CIa for connection to the server 300A in the intermediary server 400.

In S87, the server 300A stores the email address included in the connection information registration instruction in association with the GUID of the printer 100 in the non-volatile memory 330.

After the printer 100 transmits the connection information registration instruction to the server 300A, the printer 100 executes the initialization process in S88 similarly to S62 in FIG. 4, and changes the state of the printer 100 to the state at factory shipment.

In S90 to S93, the same process as that in S64 to S67 in FIG. 4 is executed. In S90, the printer 100 establishes a communication connection with the intermediary server 400 by using the intermediary server information RSI, and transmits a request for the connection information to the intermediary server 400.

In S92, the intermediary server 400 identifies the connection information CIa associated with the received GUID in the connection-information database CDB and transmits the connection information CIa to the printer 100. As a result, the printer 100 receives the connection information CIa from the intermediary server 400. In S93, the printer 100 stores the received connection information CIa in the non-volatile memory 130.

In S94, the printer 100 transmits a reuse confirmation request to the server 300A. For example, the printer 100 establishes a communication connection with the server 300A by using the connection information CIa, and transmits, to the server 300A, a reception confirmation request including the GUID of the printer 100. The reception confirmation request is a request for confirming (inquiring) whether the service setting information SIb should be received again from the server 300A.

In response to receiving the reception confirmation request, in S96 the server 300A acquires the email address associated with the GUID included in the reception confirmation request from the non-volatile memory 330.

In S98, the server 300A transmits a reuse confirmation notification to the email address acquired in S96. As a result, the terminal apparatus 200 of the user receives the reuse confirmation notification. The re-use confirmation notification is a notification for confirming (inquiring) with the user whether the previously used service A is to be used after the initialization.

In S99, the terminal apparatus 200 displays a notification screen W2 displaying the re-use confirmation notification in response to the user's operation on the display (not shown) of the terminal apparatus 200. The notification screen W2 in FIG. 5B includes a message MS2 and the buttons BT1 and BT2. The message MS2 notifies the user that the printer 100 has been initialized and confirms (inquires) with the user whether the previously used service A is to be used after initialization. The button BT1 is a button for inputting an instruction to use the service A after the initialization (reuse instruction). The button BT2 is a button for inputting an instruction not to use the service A after the initialization.

Figure 5B:
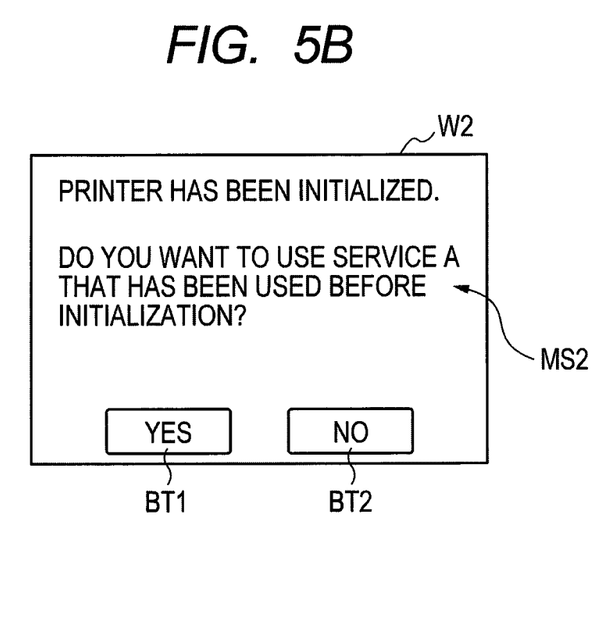

When the button BT1 is pressed, the terminal apparatus 200 acquires the re-use instruction in S100. In response to acquiring the reuse instruction, the terminal apparatus 200 transmits the reuse instruction to the server 300A in S102. The reuse instruction is transmitted to the server 300A by being transmitted to the URL associated with the button BT1, for example.

In response to receiving the reuse instruction, the server 300A transmits the reception instruction to the printer 100 in S104. The reception instruction is transmitted to the printer 100 as a response to the reception confirmation request received in S94. The reception instruction is an instruction indicating that the service setting information SIb should be received again from the server 300A.

In response to receiving the reception instruction from the server 300A, similarly to S68 in FIG. 4, the printer 100 executes the onboarding process (S14 to S26 in FIG. 3) with the server 300A in S106. In the onboarding process, as described above, the connection establishment process (S14 in FIG. 3), the authentication process (S16 in FIG. 3), and the service preparation process (S18 to S26 in FIG. 3) are executed. In the service preparation process, the printer 100 receives the service setting information SIb from the server 300A (S24 in FIG. 3) and stores the service setting information SIb in the non-volatile memory 130 (S26 in FIG. 3).

When the connection information CIa and the service setting information SIb are stored in the non-volatile memory 130, as described above, the state of the printer 100 changes to the onboard state where the service A provided by the server 300A is usable by the printer 100.

When the state of the printer 100 changes to the onboard state, in S108 the printer 100 and the server 300A execute the service process in cooperation with each other.

When the button BT2 is pressed, the terminal apparatus 200 acquires an instruction not to use the service A, instead of the reuse instruction in S100. In this case, the terminal apparatus 200 transmits the instruction not to use the service A instead of the reuse instruction to the server 300A in S102. In response to receiving the instruction not to use the service A, the server 300A transmits a reception unnecessary instruction, instead of the reception instruction to the printer 100 in S104. In response to receiving the reception unnecessary instruction, the printer 100 ends the initialization related process without executing the onboarding process.

According to the second embodiment explained above, the printer 100 executes the registration process (transmission of the connection information registration instruction in S84 in FIG. 6) without acquiring instructions from the user. The printer 100 executes the onboarding process after the reception instruction (S104 in FIG. 6) executed after the initialization process (S88 in FIG. 6), and receives the service setting information SIb again from the server 300A (S106 in FIG. 6). As a result, the service setting information SIb is received again in response to the reception instruction made after the initialization process, even when the reuse instruction is not acquired from the user before the initialization process.

According to the second embodiment, after the initialization process (S88 in FIG. 6), the printer 100 transmits, to the server 300A, a reception confirmation request confirming whether the service setting information SIb should be received from the server 300A again (S94 in FIG. 6). In response to receiving the reception instruction from the server 300A as a response to the reception confirmation request (S104 in FIG. 6), the printer 100 receives the service setting information SIb from the server 300A again (S106 in FIG. 6).

According to the second embodiment, the printer 100 transmits, to the server 300A, the email address as notification information for notifying the user (S84 in FIG. 6). By using the notification information, the server 300A transmits a reuse confirmation notification for confirming with the user whether the service A provided by the server 300A is to be used (S98 in FIG. 6). In response to receiving the instruction to use the service A as a response to the confirmation notification, the server 300A transmits the reception instruction of the service setting information SIb to the printer 100 (S104 in FIG. 6). The printer 100 receives the service setting information SIb again from the server 300A in response to the reception of the reception instruction (S106 in FIG. 6). As a result, even if the printer 100 does not include the display 140, the printer 100 receives the service setting information SIb after confirming the intention of the user to use the service A. This resultantly suppresses transition of the printer 100 to the onboard state against the intention of the user, even in a case where the printer 100 does not include the display 140, for example.

In the second embodiment, the notification information is an email address. Since email addresses are widely used, the re-use confirmation notification is delivered to the user appropriately. Thus, the intention of the user is confirmed appropriately.

C. MODIFICATION

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below.

(1) In the initialization related processes in the above first embodiment, the registration process of the connection information CIa executed by the printer 100 is to transmit the connection information registration instruction to the server 300A (S58 in FIG. 4), but the present disclosure is not limited to this. The registration process of the connection information CIa executed by the printer 100 may be a process of registering the connection information CIa in the intermediary server 400 by transmitting the connection information CIa to the intermediary server 400 by the printer 100 itself.

Figure 7:
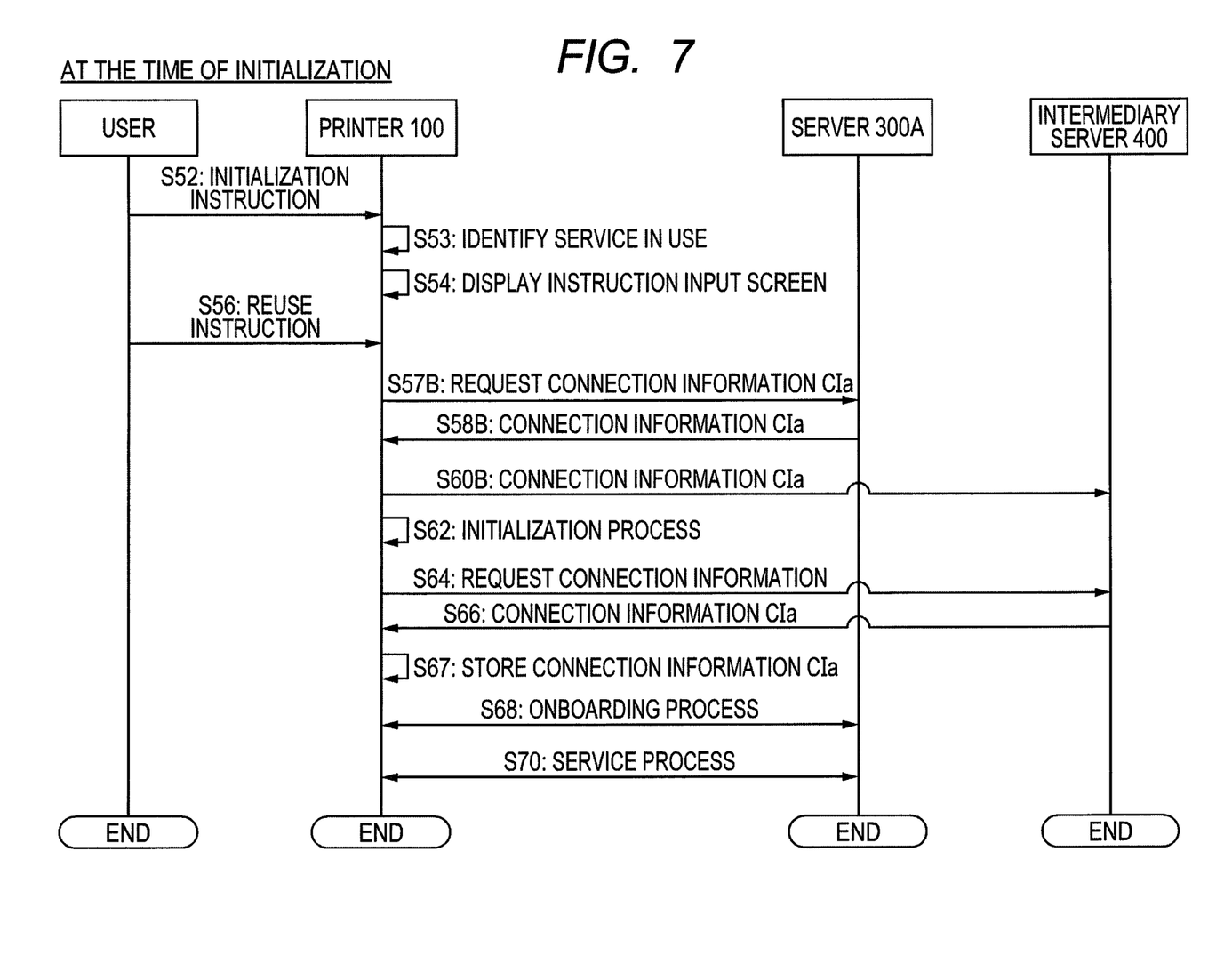
FIG. 7 is a sequence diagram of an initialization related process.

FIG. 7 is a first sequence diagram of the initialization related processes of a modification. In the initialization related process in FIG. 7, steps S57B to 560B in FIG. 7 are executed instead of S58, S60 in FIG. 4. The other processes in FIG. 7 are the same as the processes with the same signs in FIG. 4.

In S57B, the printer 100 transmits a connection information request requesting transmission of the connection information CIa to the server 300A. In response to receiving the connection information request, in S58B the server 300A transmits, to the printer 100, the connection information CIa for connection to the server 300A as a response to the connection information request. As a result, the printer 100 receives the connection information CIa.

In response to receiving the connection information CIa, in 560B the printer 100 transmits the received connection information CIa together with the GUID to the intermediary server 400. The intermediary server 400 registers the received connection information CIa and the GUID in association with each other in the connection information database CDB.

In this modification, too, the connection information CIa is registered appropriately in the intermediary server 400 before the initialization process (S62).

(2) In the above first embodiment, in the initialization related process in FIG. 4, the process by the server 300A of registering the connection information CIa in the intermediary server 400 (S60) is executed only once. Thus, an allowed period allowed before the request for the connection information CIa is transmitted to the intermediary server 400 (S64 in FIG. 4) after the printer 100 is initialized needs to be within a first particular period (one week in this embodiment) from when the connection information CIa is registered in the intermediary server 400 to when the connection information CIa is deleted.

When an installation place of the printer 100 is changed after the initialization of the printer 100, for example, some time is required until the printer 100 is installed to be connectable with the Internet IT in some cases. In such a case, if the allowed period is extremely short, the printer 100 may be unable to receive the connection information CIa from the intermediary server 400 after the initialization process, and may be unable to execute the onboarding process.

Figure 8:
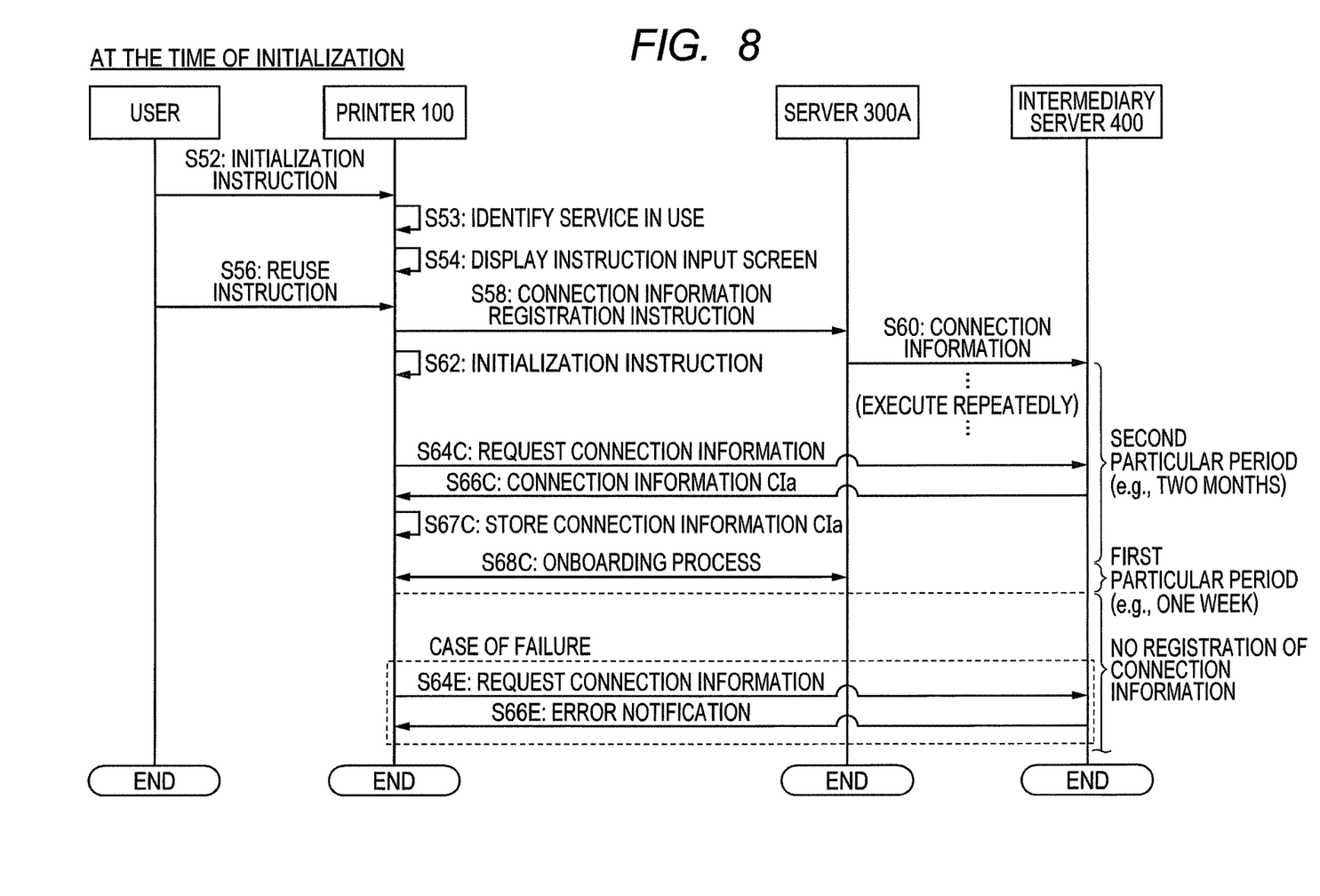
FIG. 8 is a sequence diagram of an initialization related process.

FIG. 8 is a second sequence diagram of the initialization related process of a modification. As shown in FIG. 8, in this modification, the process of registering the connection information CIa in S60 in FIG. 3 is repeatedly executed over a second particular period (two months, for example) at an interval shorter than the first particular period. As a result, the above allowed period is extended to the total period of the second particular period and the first particular period.

As shown in S64C in FIG. 8, in the modification in FIG. 8, by transmitting the request for the connection information CIa to the intermediary server 400 within the allowed period, the printer 100 receives the connection information CIa from the intermediary server 400 in S66C and stores the connection information CIa in the non-volatile memory 130 in S67C. In this case, as shown in S68C, the printer 100 executes the onboarding process after that, and receives the service setting information SIb from the server 300A, and stores the service setting information SIb in the non-volatile memory 130.

In contrast, as shown in S64E surrounded by a dashed line in FIG. 8, assume that the printer 100 transmits the request for the connection information CIa to the intermediary server 400 after the above allowed period has elapsed. In this case, since the connection information CIa has been deleted from the intermediary server 400 at this point of time, the printer 100 does not receive the connection information CIa from the intermediary server 400 but receives an error notification from the intermediary server 400 in S66E. In this case, since the printer 100 is unable to execute the onboarding process, the printer 100 is unable to receive the service setting information SIb from the server 300A.

(3) In the initialization related process in the first embodiment (FIG. 4), the display of the instruction input screen W1 in S54 and the acquisition of the reuse instruction in S56 may be omitted. That is, without acquiring the user's instruction, the process in S58 and thereafter may be executed automatically after S53. For example, a device of some type always operates by using a particular service provided by a particular server. In such a case, according to this modification, without acquiring the user's instructions, the device is changed to the onboard state where the specific service is usable after the initialization process. As a result, a burden on the user is further reduced.

(4) In the initialization related process in the first embodiment (FIG. 4), the printer 100 may execute the process starting from S64 in response to acquiring, from the user, a start instruction of the onboarding process after the initialization process in S62. Alternatively, the printer 100 may execute the process in S68 in response to acquiring, from the user, a start instruction of the onboarding process after reception of the connection information CIa in S66. In this case, for example, in a case where the user wants to perform particular manual settings on the printer 100 after the initialization process and then use the service A by using the printer 100, automatic execution of the onboarding process before the particular manual settings is suppressed.

In the initialization related process in the second embodiment (FIG. 6), in response to receiving the reception instruction from the server 300A (S104 in FIG. 6), the printer 100 executes the onboarding processing in S106. Alternatively, in response to receiving the reception instruction from the user's terminal apparatus 200, for example, the printer 100 may execute the onboarding process in S106.

(5) In the second embodiment, the reuse confirmation notification is sent as an e-mail addressed to the user's e-mail address. Alternatively, the reuse confirmation notification may be sent in another way, for example, as a push notification addressed to a particular application installed on the terminal apparatus 200.

(6) In each of the above-described embodiments, as the transition process, the initialization process for changing the state of the printer 100 to the state at the time of shipment from the factory is employed. Alternatively, the transition process may be, for example, a network initialization process in which network-related settings are returned to factory defaults, and other settings (for example, settings related to printing) are not changed. Alternatively, the transition process may be an external service initialization process in which service setting information for using the services A to D provided by the servers 300A to 300D and connection information for connecting to the servers 300A to 300D providing these services A to D are deleted from the non-volatile memory 330.

(7) In each of the above embodiments, the printer 100 is adopted as the device. Alternatively, another device that cooperates with the target server to provide a service to a user may be employed. The services using other devices include, for example, a service of remotely controlling other devices (for example, surveillance cameras, electrical appliances such as cooking utensils) set in homes and offices from a terminal apparatus (terminal application) via a target server.

(8) In the above embodiments, a part of the configurations implemented by hardware may be replaced with software, or conversely, a part or all of the configurations implemented by software may be replaced by hardware.

What is claimed is:

1. A device comprising:
    a communication interface;
    a memory storing intermediary server information for connecting to an intermediary server, the intermediary server being configured to store device identification information and connection information in association with each other, the device identification information indicating the device, the connection information being information indicating a location of a target server to be connected; and
    a controller configured to:
        connect, via the communication interface, to the intermediary server by using the intermediary server information, and receive the connection information from the intermediary server in a case where the connection information is stored in the intermediary server;
        connect, via the communication interface, to the target server by using the connection information, and receive setting information from the target server, the setting information being information for the device to use a service provided by the target server;
        store the received setting information in the memory;

perform a registration process for again storing the connection information in the intermediary server;

after the registration process, perform a transition process of changing a state of the device from a first state to a second state, the first state being a state where the setting information is stored in the memory and the service is usable by the device, the second state being a state where the intermediary server information is stored in the memory and the connection information is not stored in the memory and the setting information is not stored in the memory;

after the transition process, receive, from the intermediary server, the connection information that is again stored;

connect, via the communication interface, to the target server by using the received connection information and again receive the setting information from the target server; and store, in the memory, the setting information that is again received.

2. The device according to claim 1, wherein the registration process is a process of transmitting, to the target server, a registration instruction for causing the target server to perform registration of the connection information in the intermediary server.

3. The device according to claim 1, wherein the controller is configured to:

acquire, from a user, an execution instruction of the registration process in a case where the transition process is to be executed; and execute the registration process in response to acquiring the execution instruction.

4. The device according to claim 3, wherein the controller is configured to, after the transition process:

receive the connection information that is stored again from the intermediary server, without acquiring an instruction from the user; and again receive the setting information from the target server, without acquiring an instruction from the user.

5. The device according to claim 1, wherein the controller is configured to:

execute the registration process without acquiring an instruction from a user;

after the transition process, receive a reception instruction; and after receiving the reception instruction, again receive the setting information from the target server.

6. The device according to claim 5, wherein the controller is configured to:

after the transition process, transmit, to the target server, a confirmation request for confirming whether the setting information is to be received again from the target server; and in response to receiving, from the target server, the reception instruction as a response to the confirmation request, again receive the setting information from the target server.

7. The device according to claim 6, wherein the controller is configured to transmit, to the target server, a notification information for notification to the user; and wherein the target server is configured to:

by using the notification information, transmit a confirmation notification for confirming whether the user uses the service provided by the target server; and in response to receiving an instruction of using the service as a response to the confirmation notification, transmit the reception instruction to the device.

8. The device according to claim 7, wherein the notification information is an email address.

9. The device according to claim 1, wherein the device is a printer configured to print an image on a print medium; and wherein the service provided by the target server includes a setup service, a consumable management service, or a print service, the setup service being a service for installing programs in the printer and performing particular settings, the consumable management service being a service for managing a remaining amount of a consumable in the printer, the print service being a service for generating a print job and transmitting the generated print job to the printer for printing.

10. The device according to claim 2, wherein the registration of the connection information includes transmitting the connection information and the device identification information of the device from the target server to the intermediary server.

11. The device according to claim 1, wherein the transition process includes an initialization process, a network initialization process, or an external service initialization process, the initialization process being a process of changing the state of the device to a state at shipment from a factory, the network initialization process being a process in which network-related settings are returned to factory defaults and other settings are not changed, the external service initialization process being a process in which the setting information for using the service provided by the target server and the connection information for connecting to the target server are deleted from the memory.

12. The device according to claim 1, wherein the registration process includes:

transmitting, to the target server, a connection information request for requesting transmission of the connection information;

receiving, from the target server, the connection information as a response to the connection information request; and in response to receiving the connection information, transmitting the received connection information together with the device identification information to the intermediary server.

13. The device according to claim 1, wherein the registration process includes:

transmitting, to the target server, an instruction of performing registration of the connection information repeatedly over a particular period at a particular interval;

in response to transmitting, to the intermediary server, a request for the connection information within an allowed period from first registration of the connection information, receiving the connection information from the intermediary server, the allowed period being a total period of the particular period and the particular interval; and in response to transmitting, to the intermediary server, the request for the connection information after the allowed period elapses from the first registration of the connection information, receiving an error notification from the intermediary server.

14. A non-transitory computer-readable storage medium storing a set of program instructions for a device comprising a controller, a communication interface and a memory, the memory storing intermediary server information for connecting to an intermediary server, the intermediary server being configured to store device identification information and connection information in association with each other, the device identification information indicating the device, the connection information being information indicating a location of a target server to be connected, the set of program instructions, when executed by the controller, causing the device to:
- connect, via the communication interface, to the intermediary server by using the intermediary server information, and receive the connection information from the intermediary server in a case where the connection information is stored in the intermediary server;
- connect, via the communication interface, to the target server by using the connection information, and receive setting information from the target server, the setting information being information for the device to use a service provided by the target server;
- store the received setting information in the memory;
- perform a registration process for again storing the connection information in the intermediary server;
- after the registration process, perform a transition process of changing a state of the device from a first state to a second state, the first state being a state where the setting information is stored in the memory and the service is usable by the device, the second state being a state where the intermediary server information is stored in the memory and the connection information is not stored in the memory and the setting information is not stored in the memory;
- after the transition process, receive, from the intermediary server, the connection information that is again stored;
- connect, via the communication interface, to the target server by using the received connection information and again receive the setting information from the target server; and
- store, in the memory, the setting information that is again received.

* * * * *